US009156551B2

(12) United States Patent
Szarek et al.

(10) Patent No.: US 9,156,551 B2
(45) Date of Patent: Oct. 13, 2015

(54) TILT-BALL TURRET WITH GIMBAL LOCK AVOIDANCE

(75) Inventors: Thomas Szarek, Oak Park, CA (US); Thomas Omer, Moorpark, CA (US); Manolis Pavlos Dimotakis, Altadena, CA (US); Jefferson C. McBride, Simi Valley, CA (US)

(73) Assignee: AeroVironment, Inc., Monrovia, CA (US)

( * ) Notice: Subject to any disclaimer, the term of this patent is extended or adjusted under 35 U.S.C. 154(b) by 694 days.

(21) Appl. No.: 13/220,619

(22) Filed: Aug. 29, 2011

(65) Prior Publication Data

US 2013/0048792 A1 Feb. 28, 2013

(51) Int. Cl.
*B64C 39/02* (2006.01)
*B64D 47/08* (2006.01)
*F16M 11/12* (2006.01)
*F16M 11/18* (2006.01)

(52) U.S. Cl.
CPC .............. *B64C 39/024* (2013.01); *B64D 47/08* (2013.01); *F16M 11/123* (2013.01); *F16M 11/126* (2013.01); *F16M 11/18* (2013.01); *B64C 2201/021* (2013.01); *B64C 2201/123* (2013.01); *B64C 2201/127* (2013.01)

(58) Field of Classification Search
CPC ............ B64C 39/024; B64C 2201/127; B64C 2201/021; B64C 2201/123; B64D 47/08; F16M 11/126; F16M 11/123; F16M 11/18
USPC ............... 244/175, 131; 348/151, 211.99, 36; 396/427, 428
See application file for complete search history.

(56) References Cited

U.S. PATENT DOCUMENTS

| 3,638,502 | A |   | 2/1972 | Leavitt et al. |
| 4,217,606 | A |   | 8/1980 | Nordmann |
| 4,855,823 | A | * | 8/1989 | Struhs et al. .................. 348/151 |
| 5,153,623 | A | * | 10/1992 | Bouvier ........................ 396/427 |
| 5,251,118 | A |   | 10/1993 | Budnovitch et al. |
| 5,383,645 | A |   | 1/1995 | Pedut et al. |
| 5,897,223 | A |   | 4/1999 | Tritchew et al. |

(Continued)

FOREIGN PATENT DOCUMENTS

| CN | 201099352 A | 8/2008 |
| CN | 101766049 A | 6/2010 |
| TW | 211058 | 8/1993 |

OTHER PUBLICATIONS

PCT International Search Report and Written Opinion in International Application No. PCT/US12/52727, mailed on Mar. 18, 2013.

(Continued)

*Primary Examiner* — Valentina Xavier
(74) *Attorney, Agent, or Firm* — Nixon Peabody LLP; Eric Aagaard

(57) ABSTRACT

A turret assembly for attachment on the undersurface of an aircraft that reduces performance limitations due to gimbal lock and reduces the cross section profile of the assembly. The assembly includes a roll actuator including a drive shaft. A yoke having a cross member is coupled to the drive shaft and a pair of prongs. The yoke is rotated via the roll actuator and drive shaft along a roll axis oriented substantially parallel to the body of the aircraft. A turret is mounted on the prongs of the yoke. A tilt actuator is contained within the turret. The tilt actuator tilts the turret on a tilt axis relative to the yoke. The tilt axis is perpendicular to the roll axis.

12 Claims, 12 Drawing Sheets

(56) References Cited

U.S. PATENT DOCUMENTS

| | | | |
|---|---|---|---|
| 5,936,245 | A | 8/1999 | Goillot et al. |
| 6,056,237 | A | 5/2000 | Woodland |
| 6,147,701 | A * | 11/2000 | Tamura et al. ............... 348/36 |
| 6,226,125 | B1 | 5/2001 | Levy et al. |
| D452,697 | S * | 1/2002 | Fallowfield et al. ......... D16/242 |
| 6,628,338 | B1 | 9/2003 | Elberbaum et al. |
| 7,000,883 | B2 | 2/2006 | Mercadal et al. |
| 7,058,721 | B1 | 6/2006 | Ellison et al. |
| 7,695,647 | B2 | 4/2010 | Smela et al. |
| 7,747,364 | B2 | 6/2010 | Roy et al. |
| 7,955,006 | B1 * | 6/2011 | Harvey ...................... 396/428 |
| 8,091,833 | B2 * | 1/2012 | von Flotow et al. ......... 244/131 |
| 8,137,007 | B1 | 3/2012 | Harvey |
| 8,140,200 | B2 | 3/2012 | Heppe et al. |
| 8,174,612 | B1 | 5/2012 | Koehler |
| D662,120 | S | 6/2012 | Deurwaarder |
| 8,226,039 | B2 * | 7/2012 | von Flotow et al. ......... 244/131 |
| D668,701 | S * | 10/2012 | Ohno et al. ................. D16/219 |
| 2002/0008759 | A1 * | 1/2002 | Hoyos ......................... 348/211 |
| 2004/0026573 | A1 | 2/2004 | Andersson et al. |
| 2004/0173726 | A1 | 9/2004 | Mercadal et al. |
| 2004/0230352 | A1 | 11/2004 | Monroe |
| 2005/0219639 | A1 | 10/2005 | Fujise et al. |
| 2006/0016966 | A1 | 1/2006 | Hughes et al. |
| 2006/0033288 | A1 | 2/2006 | Hughes et al. |
| 2006/0110155 | A1 | 5/2006 | Kouchi et al. |
| 2006/0231675 | A1 | 10/2006 | Bostan |
| 2007/0031151 | A1 | 2/2007 | Cunningham et al. |
| 2008/0215204 | A1 | 9/2008 | Roy et al. |
| 2008/0267612 | A1 | 10/2008 | Harvey |
| 2008/0277631 | A1 | 11/2008 | Smela et al. |
| 2009/0015674 | A1 | 1/2009 | Alley et al. |
| 2009/0216394 | A1 * | 8/2009 | Heppe et al. ................. 701/16 |
| 2009/0218447 | A1 * | 9/2009 | von Flotow et al. ......... 244/131 |
| 2009/0273671 | A1 | 11/2009 | Gardner |
| 2009/0284644 | A1 | 11/2009 | McKaughan et al. |
| 2010/0141503 | A1 | 6/2010 | Baumatz |
| 2010/0241931 | A1 | 9/2010 | Choi et al. |
| 2010/0265329 | A1 | 10/2010 | Doneker |
| 2010/0309344 | A1 | 12/2010 | Zimmer et al. |
| 2011/0103021 | A1 | 5/2011 | Janssen et al. |
| 2012/0104169 | A1 * | 5/2012 | von Flotow et al. ......... 244/131 |
| 2012/0106800 | A1 | 5/2012 | Khan et al. |
| 2012/0200703 | A1 | 8/2012 | Nadir et al. |
| 2012/0320203 | A1 | 12/2012 | Liu |
| 2013/0048792 | A1 | 2/2013 | Szarek et al. |
| 2013/0135471 | A1 | 5/2013 | Giuffrida et al. |

OTHER PUBLICATIONS

PCT International Search Report and Written Opinion in International Application No. PCT/US12/52728., Date of Mailing: Mar. 19, 2013.
PCT International Search Report and Written Opinion in International Application No. PCT/US12/52723, mailed on May 3, 2013.
PCT International Search Report and Written Opinion in International Application No. PCT/US12/52725, mailed on May 3, 2013.
PCT International Search Report and Written Opinion in International Application No. PCT/US12/52729, mailed on May 13, 2013.
Notice of Allowance in U.S. Appl. No. 13/220,562, mailed on May 1, 2013.
Notice of Allowance in U.S. Appl. No. 13/220,617, mailed on Jun. 10, 2013.
Office Action in U.S. Appl. No. 13/220,617 dated Dec. 4, 2012.
Office Action in U.S. Appl. No. 13/220,562 dated Nov. 23, 2012.
Office Action in U.S. Appl. No. 13/220,535, mailed Aug. 2, 2013. (68).
Final Office Action in U.S. Appl. No. 13/220,535, mailed Feb. 27, 2014. (68).
Final Office Action in U.S. Appl. No. 13/220,535, mailed Aug. 1, 2014. (68).
Office Action in U.S. Appl. No. 13/220,535, mailed Dec. 2, 2014. (68).
Final Office Action in U.S. Appl. No. 13/220,197, mailed Jun. 2. 2014. (67).
Office Action and Search Report in TW Application No. 101130828, dated Nov. 11, 2014, 16 pages.
Office Action and Search Report in TW Application No. 101130829, dated May 14, 2014, 12 pages.
Office Action in TW Application No. 101130829, dated Sep. 29, 2014, 6 pages.
Office Action and Search Report in TW Application No. 101130830 dated Oct. 30, 2014, 10 pages.
Office Action and Search Report in TW Application No. 101130827 dated Feb. 12, 2015, 14 pages.
Office Action for U.S. Appl. No. 13/967,720, mailed Oct. 8, 2014.
Notice of Allowance for U.S. Appl. No. 13/967,720, mailed Mar. 25, 2015.

* cited by examiner

TILT-BALL TURRET WITH GIMBAL LOCK AVOIDANCE

TECHNICAL FIELD

The present disclosure relates generally to a moveable ball turret for surveillance aircraft and more specifically to a ball turret having tilt and roll actuation with gimbal lock avoidance.

BACKGROUND

The way that the Vietnam War is now remembered as the helicopter war, the current conflicts in Iraq and Afghanistan may be remembered for the use of unmanned aerial surveillance (UAV) craft or drones. Drones may facilitate remote intelligence gathering, alleviating the need for foot soldiers to enter into hostile areas "blind," with little or no information about the location and strength of hostile forces. Drones may provide close combat support, such as identifying and eliminating targets of interest, alleviating the need to expose soldiers and/or airmen to potential small arms fire, mortars, rocket grenades, road-side bombs, anti-aircraft weaponry, missiles, and other dangers.

Although many presently used drones are the roughly the same scale size as piloted aircraft, such aircraft are both relatively expensive and may be detected due to their size. Recently, smaller drones have been developed that may be deployed in greater numbers and are relatively less expensive resulting in greater use by individual units in the field. Smaller drones have certain tradeoffs as they cannot carry the amount of payload of a larger drone. Further, power for such smaller drones is limited due to the size of the aircraft and therefore operating periods are also limited.

Unmanned drone aircraft typically mount a camera in a ball turret assembly which allows movement in three dimensions to allow the camera to track objects on the ground without altering the flight path of the aircraft. Data such as image data may be captured via a sensor such as a camera and transmitted back to a controller. Known ball turret assemblies use a pan tilt mechanism with a cylindrical or spherical turret to mount a sensor such as a camera. Such devices are suspended from the bottom of the aircraft via a fork shaped yoke that may be rotated around a roll axis via a roll actuator. The tilt motion of such a turret starts from zero degrees pointing the camera straight down to a 90 degree positive or negative tilt pointing the camera in the direction of the flight of the aircraft. Thus, such arrangements traditionally have a roll axis that is vertical and a tilt axis is 90 degrees offset from the roll axis.

Current turret designs require gimbals and mounting structures that present a relatively large cross-profile. Thus, drag based on the turret mounting for known turret designs is a consideration especially when drag decreases fuel efficiency and decreases operational range. Such increased drag is a significant factor in limiting the range of smaller drones that have limited power supplies. Further, for certain important viewing areas such as the area directly below the aircraft, the gimbal is locked and therefore panning to the right or left is more difficult to access using the traditional actuators because the tilt simply rotates the turret toward the front or rear of the aircraft. Thus panning right or left requires rotating the turret on the roll axis and then tilting the turret. As with all components, fewer moving parts are desirable and this is especially true with smaller drones where the efficiency of the payload needs to be maximized. Ideally, the portion of the coverage affected by gimbal lock should be an area that is less important or not important at all. As explained above, current gimbal designs put gimbal lock either directly below the aircraft, or point them directly forward and therefore gimbal lock effects relatively important viewing areas.

A further issue is the wiring needed to power and draw data from sensors such as cameras in the ball turret. In known ball turret assemblies, such wiring inhibits the full range of movement of the camera on the ball turret resulting in limited vision. For example, if the turret is rotated to view the area directly below the aircraft, the movement is constrained by the electrical wiring which does not allow the ball to be rotated fully. Since it is desirable for the turret to be rotated fully, conventional mountings substitute a brush interface (a slip ring) for physical wiring which limits the bandwidth thereby limiting data transmission.

Thus, it would be desirable to have a ball turret mounting system to minimize cross-section and thereby minimize drag. It would also be desirable to have a mounting system for a ball turret that allows efficient actuators for maximum coverage for cameras in the ball turret. Also, it would be desirable to provide a physical wired connection to provide greater data bandwidth.

SUMMARY

According to one example a turret assembly for attachment on the undersurface of an aircraft is disclosed. The assembly includes a roll actuator including a drive shaft. A yoke having a cross member is coupled to the drive shaft and a pair of prongs. The yoke is rotated via the roll actuator and drive shaft along a roll axis oriented substantially parallel to the body of the aircraft. A turret is mounted on the prongs of the yoke. A tilt actuator is located within the turret. The tilt actuator tilts the turret on a tilt axis relative to the yoke. The tilt axis is perpendicular to the roll axis.

Another example is an aircraft having a fuselage having an undersurface. A control system accepts positioning commands from a ground station. A data control system sends data to the ground station. A roll actuator includes a drive shaft. A yoke has a cross member coupled to the drive shaft and a pair of prongs. The yoke is rotated via the roll actuator and drive shaft along a roll axis oriented substantially parallel to the body of the aircraft. A turret is mounted on the prongs of the yoke. A tilt actuator is located within the turret. The tilt actuator tilts the turret on a tilt axis relative to the yoke. The tilt axis is perpendicular to the roll axis.

Another example is a method of positioning a turret mounted on the prongs of a yoke having a cross member coupled to a drive shaft and a pair of prongs on the undersurface of an aircraft. The turret is rotated via a roll actuator coupled to the drive shaft along a roll axis oriented substantially parallel to the body of the aircraft. The turret is tilted via a tilt actuator within the turret on a tilt axis relative to the yoke, the tilt axis being perpendicular to the roll axis.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1A:
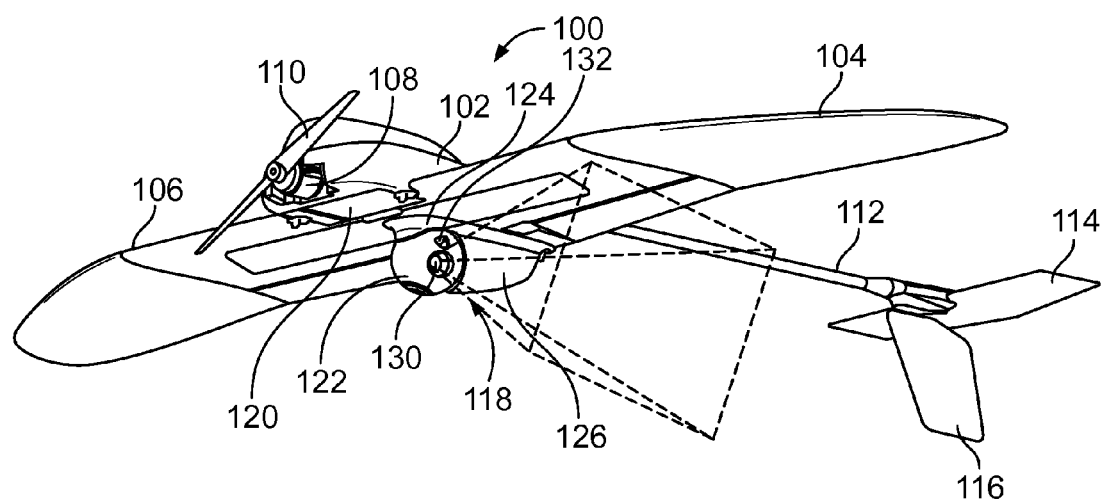
FIGS. 1A and 1B is a perspective view of an unmanned surveillance aircraft having an example ball turret assembly.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1B:
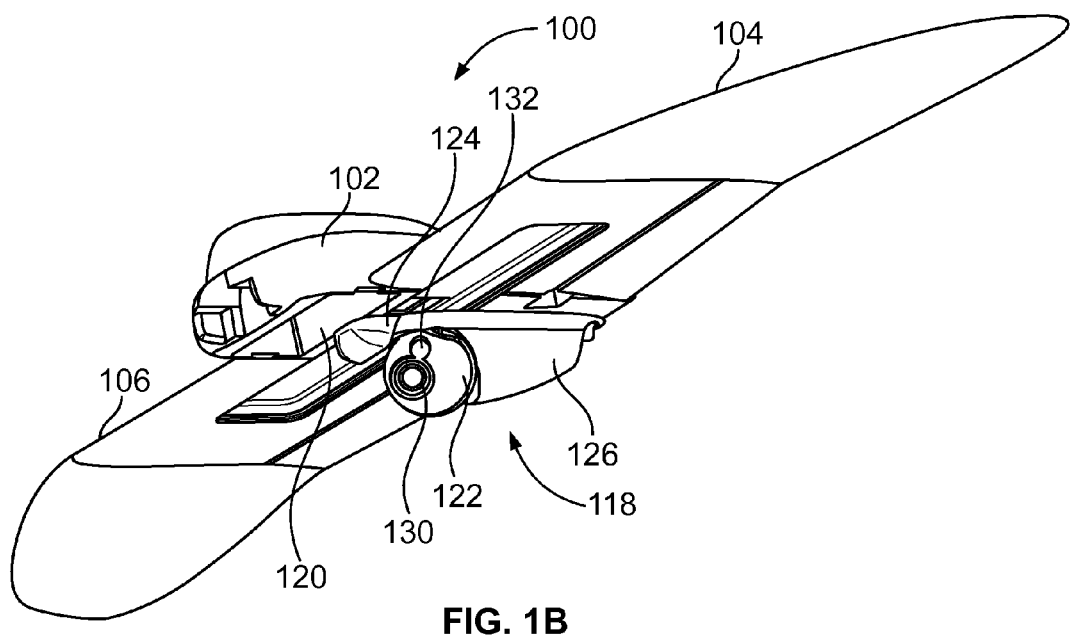

FIGS. 1A and 1B are perspective views of an unmanned reconnaissance aircraft 100. The aircraft 100 has a fuselage 102 mounting a left wing 104 and a right wing 106. The aircraft 100 is powered by an engine 108 which rotates a propeller 110. The aircraft 100 is stabilized with the assistance of elevators 114 and a tail 116 mounted on a boom 112. In this example, the aircraft 100 is small enough to be carried by an individual soldier and has a top speed of about 55 knots and a cruising speed of about 25 knots. Of course, the principles described herein may be applied to larger or smaller aircraft that are faster or slower than the example aircraft 100 in FIG. 1.

The aircraft 100 includes a ball turret assembly 118 that is suspended from an under surface 120 of the fuselage 102. The ball turret assembly 118 includes a ball turret 122 that is mounted in a housing 124 on the under surface 120. The ball turret 122 is mounted in front of a fairing 126 that is also part of the housing 124. In this example, the ball turret 122 holds an infrared camera 130 and a color camera 132. In this example, the infrared camera 130 may be a MicroTau 320 or 640 model camera available from FLIR and the color camera is a 5 megapixel Model MT9P031 EO sensor. Both cameras are configured for taking approximately 30 frames per second video stream of images but may also send still images at higher resolution. Of course other types of cameras and/or sensors may be mounted in the ball turret 122. The ball turret 122 is rotated by a yoke which is mounted on the fairing 126. As will be explained below, the fairing 126 in combination with the ball turret assembly 118 reduces drag because the yoke is behind the ball turret 122. By actuators for tilting and rolling the ball turret 122, the cameras 130 and 132 may be directed toward areas under the under surface 120 of the fuselage 102. As shown in FIG. 1A, the ball turret has been rotated to point the cameras 130 and 132 to the left side of the aircraft 100. FIG. 1A shows an approximate imaging area that may be viewed by the cameras 130 and 132 in this position. FIG. 1B shows the ball turret 122 rotated to position the cameras 130 and 132 to view an area to the front of the aircraft 100.

Figure 2A:
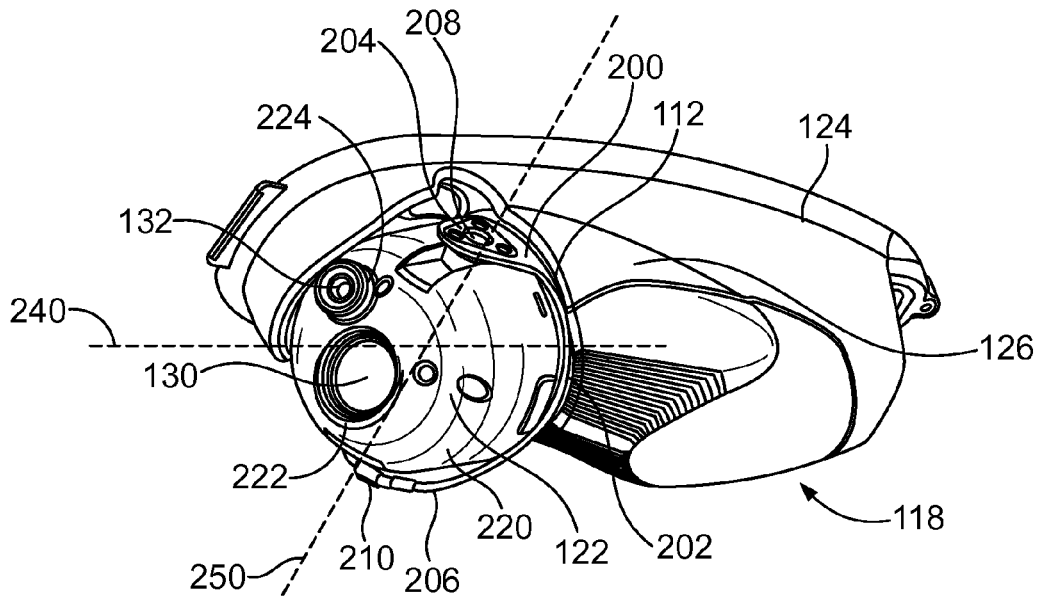
FIG. 2A is close up perspective view of the example ball turret assembly mounted on the aircraft of FIG. 1.
Figure 2B:
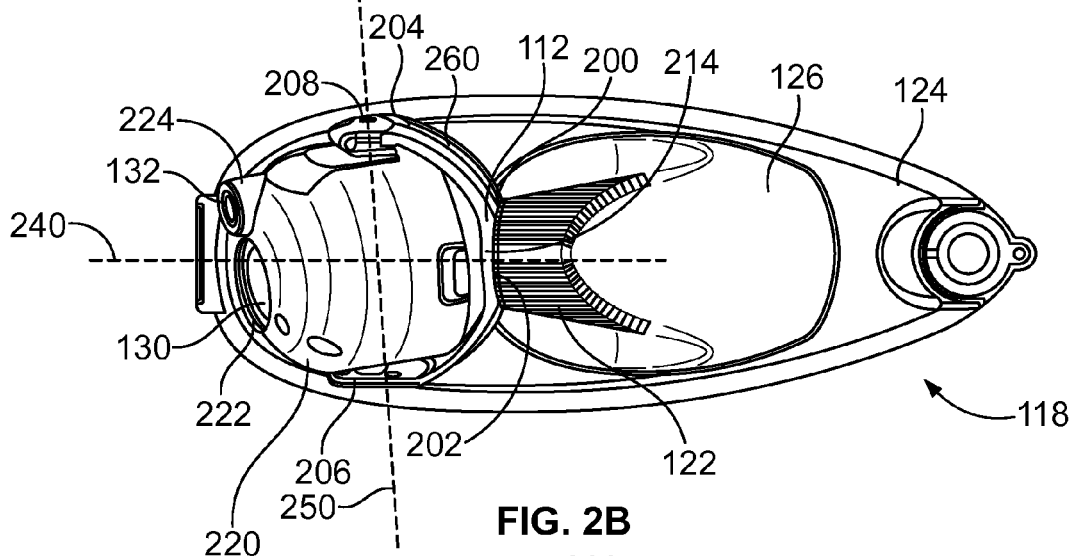
FIG. 2B is a bottom view of the example ball turret assembly in FIG. 2A.
Figure 2C:
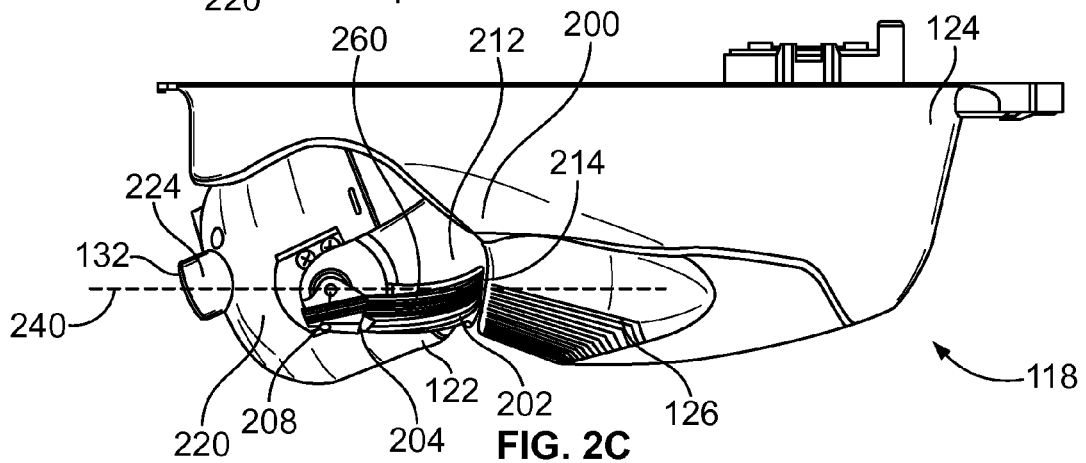
FIG. 2C is a side view of the example ball turret assembly in FIG. 2A.
Figure 2D:
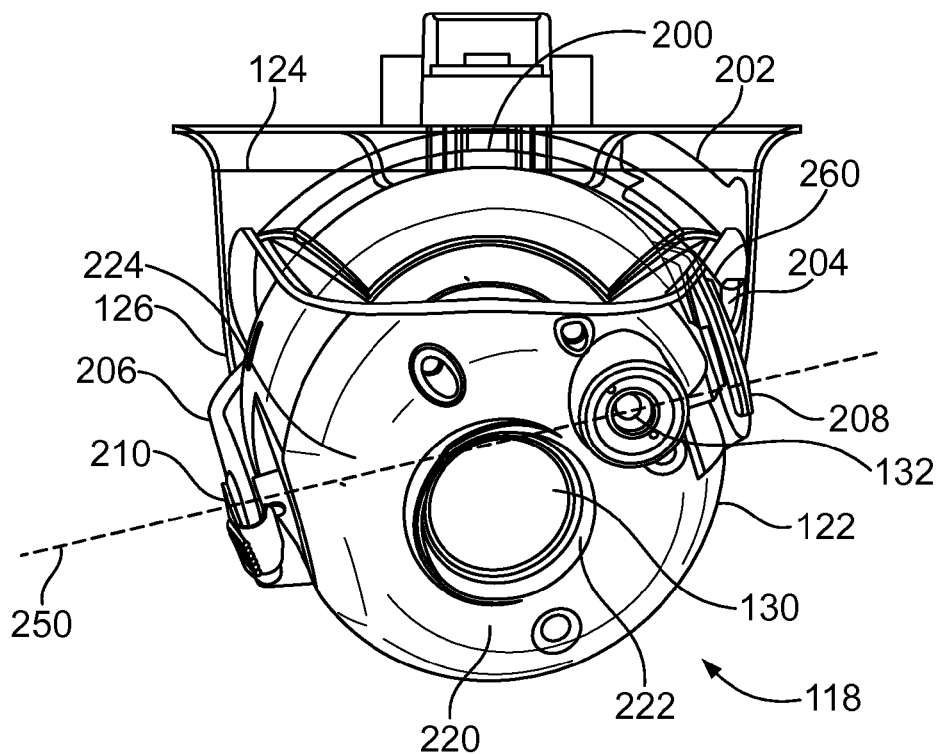
FIG. 2D is a front view of the example ball turret assembly in FIG. 2A.
Figure 2E:
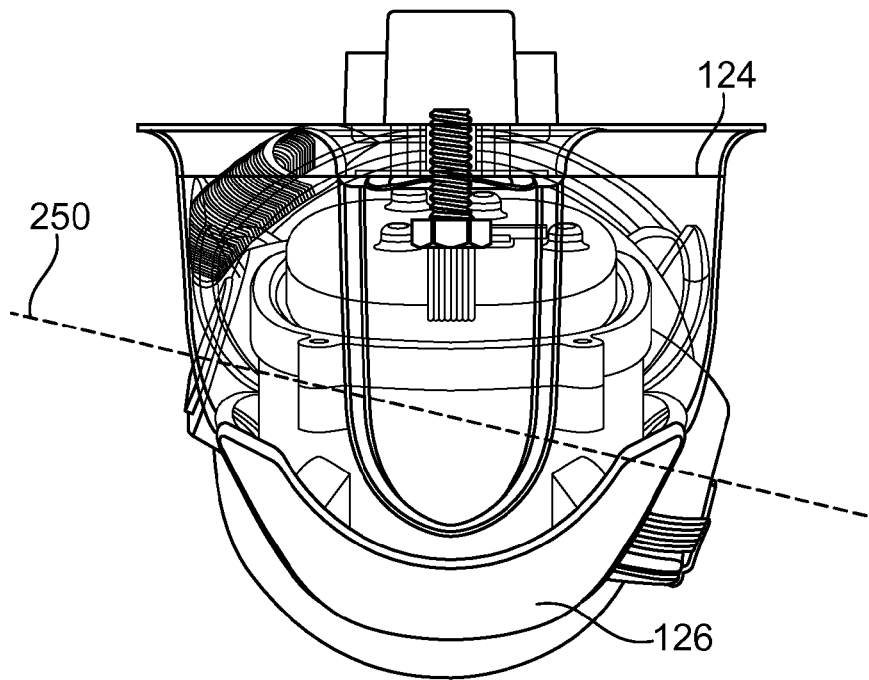
FIG. 2E is a rear view of the example ball turret assembly in FIG. 2A.

FIGS. 2A-2E are close up views of the example ball turret assembly 118 in FIG. 1. FIG. 2A is close up perspective view of the example ball turret assembly 118, FIG. 2B is a bottom view of the example ball turret assembly 118, FIG. 2C is a side view of the example ball turret assembly 118, FIG. 2D is a front view of the example ball turret assembly 118 and FIG. 2E is a rear view of the example ball turret assembly 118. The ball turret assembly 118 includes the ball turret 122 mounted on the fairing 126 on the under surface 120 of FIG. 1 via a gimbal assembly 200. A yoke 202 extends from the fairing 126. The yoke 202 includes a pair of prongs 204 and 206 that hold the ball turret 122 via pins 208 and 210. The prongs 204 and 206 have respective opposite ends from the pins 208 and 210 connected by a cross bar 212. The cross bar 212 is attached to a roll drive shaft 214 that supports the yoke 202 from the fairing 126. The ball turret 122 includes an exterior surface 220 that is water proof and sealed to protect the mechanical and electrical components such as the cameras 130 and 132 stored therein. Since the yoke 202 does not have any actuating or electronic components the number of parts requiring water-proofing is also decreased. The exterior surface 220 has an aperture 222 for the infrared camera 130 and a mounting cylinder 224 for the color camera 132.

A roll axis is represented by a dashed line 240 which points forward relative to the aircraft 100. As will be explained the ball turret 122 may be rotated around the roll axis 240 via the roll drive shaft 214 being rotated by a roll actuator in the fairing 126. A tilt axis represented by a dashed line 250 is 90 degrees offset from the roll axis 240. The ball turret 122 is therefore rotated on the prongs 204 and 206 around the tilt axis 250 via a tilt actuator contained in the turret 122. A wiring harness 260 containing wiring for power, data and communications extends from the fairing 126 to the ball turret 122 through the interior of the drive shaft 214 and is attached to the yoke 202 and follows the prong 204 to the interior of the ball turret 122.

Figure 3A:
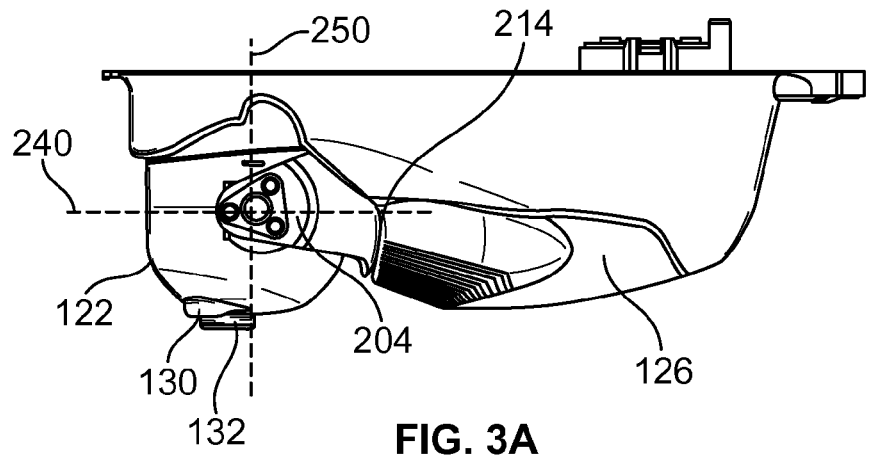
FIGS. 3A-3L are side and front views of the example ball turret in various tilt and roll positions.
Figure 3B:
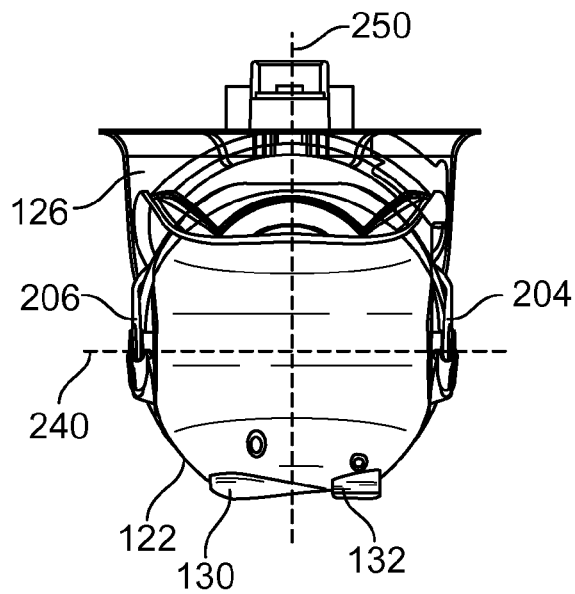

FIG. 3A-3L are side and front views of the example ball turret 122 in various degrees of tilt and roll to position the infrared camera 130 and the color camera 132 relative to the fairing 126 on the under surface 120 of the aircraft 100 in FIG. 1. FIG. 3A is a side view and FIG. 3B is a front view of the ball turret 122 at zero degrees tilt on the tilt axis 250 and zero degrees roll on the roll axis 240. As shown in FIGS. 3A-3B, the infra-red camera 130 is pointed directly down to the ground. The yoke 202 is positioned via the actuating the drive shaft 214 via a tilt actuator in the fairing 126 to rotate the prongs 204 and 206 relative to the roll axis 240. The ball turret 122 is rotated at zero degrees relative to the tilt axis 250 by the tilt actuator within the ball turret 122. In order to view areas to the immediate right or left of the ball turret 122, the yoke 202 is rotated via the drive shaft 214 thus avoiding gimbal lock.

Figure 3C:
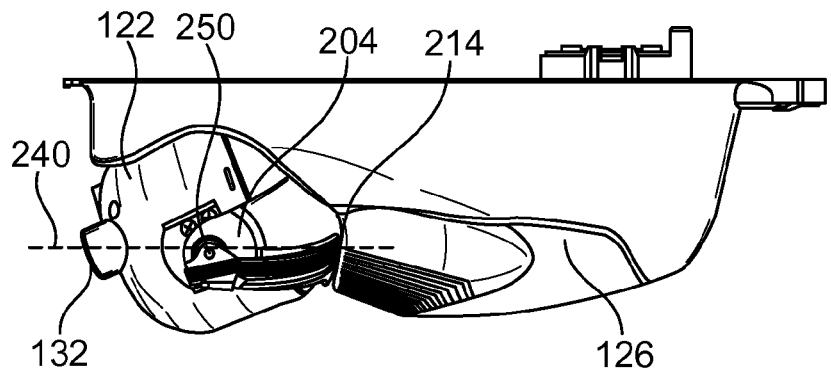
Figure 3D:
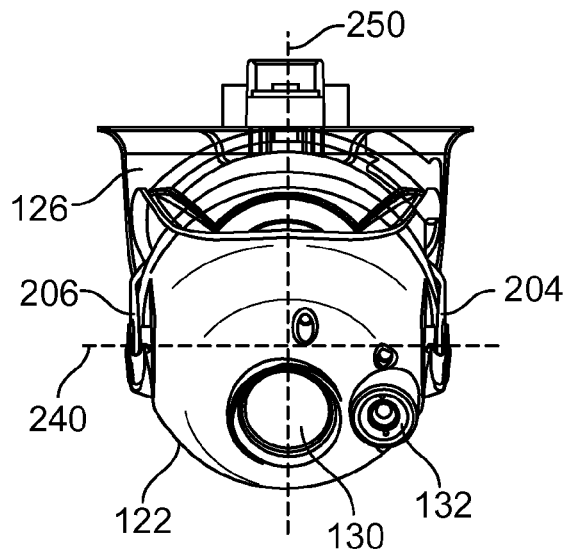

FIG. 3C is a side view and FIG. 3D is a front view of the ball turret 122 at approximately plus seventy degrees tilt and zero degrees roll. In FIGS. 3C and 3D, the ball turret 122 has been actuated around the tilt axis 250 from the positions shown in FIGS. 3A and 3B via the tilt actuator. The rotation around the roll axis 240 remains the same and therefore the cameras 130 and 132 are pointing ahead of the aircraft 100 at a down twenty degree angle from the horizontal plane.

Figure 3E:
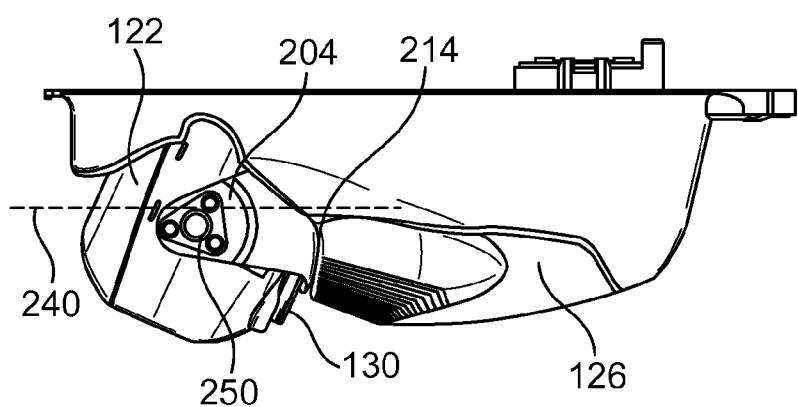
Figure 3F:
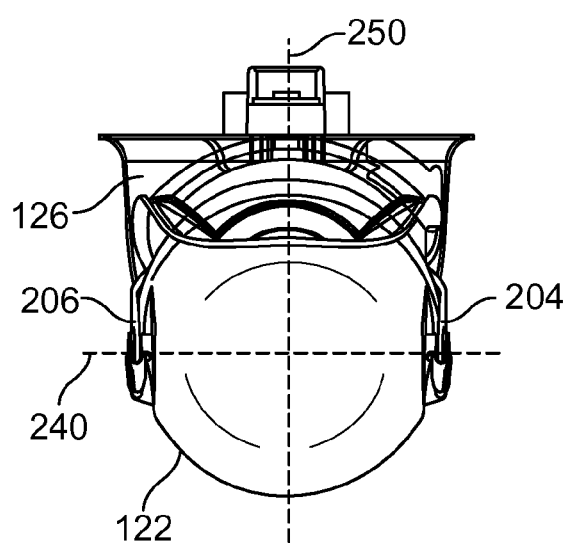

FIG. 3E is a side view and FIG. 3F is a front view of the ball turret 122 at approximately negative seventy degrees tilt and zero degrees roll. In FIGS. 3E and 3F, the ball turret 122 has been actuated around the tilt axis 250 from the positions shown in FIGS. 3A and 3B via the tilt actuator. The rotation around the roll axis 240 remains the same and therefore the cameras 130 and 132 are pointing behind the aircraft 100 at a down twenty degree angle from the horizontal plane.

Figure 3G:
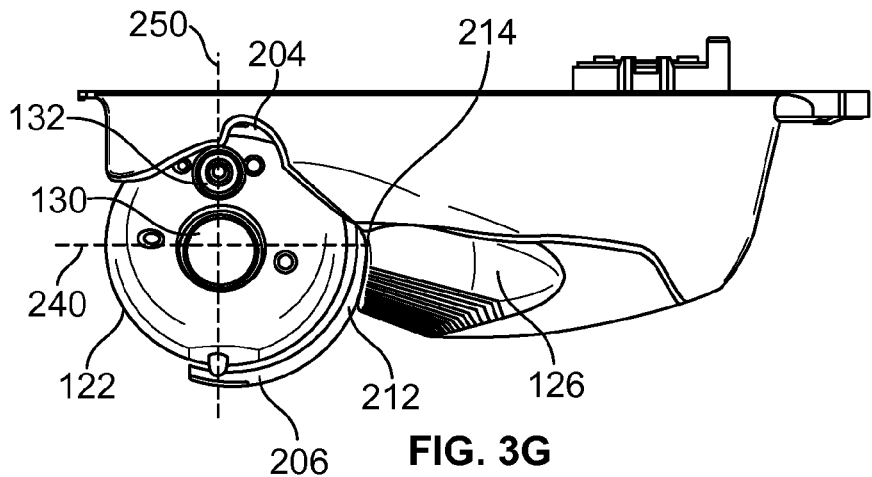
Figure 3H:
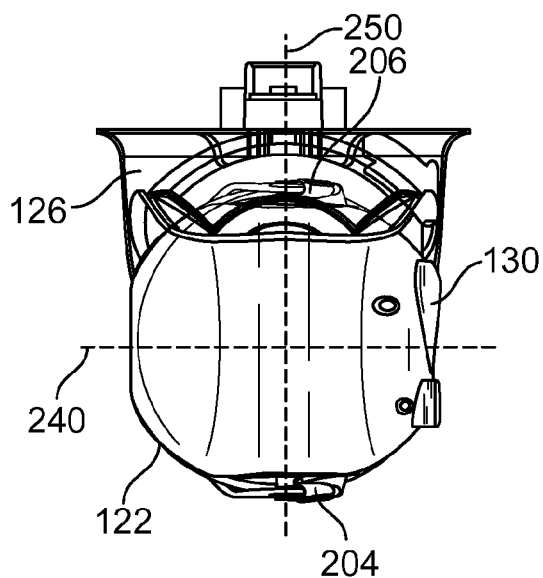

FIG. 3G is a side view and FIG. 3H is a front view of the ball turret 122 at zero degrees tilt and positive ninety degrees roll. In FIGS. 3G and 3H, the ball turret 122 has been actuated around the roll axis 240 from the positions shown in FIGS. 3A and 3B by rotating the drive shaft 214 and thereby the yoke 202. The rotation around the tilt axis 250 remains the same and therefore the cameras 130 and 132 are pointing to the left side of the aircraft 100.

Figure 3I:
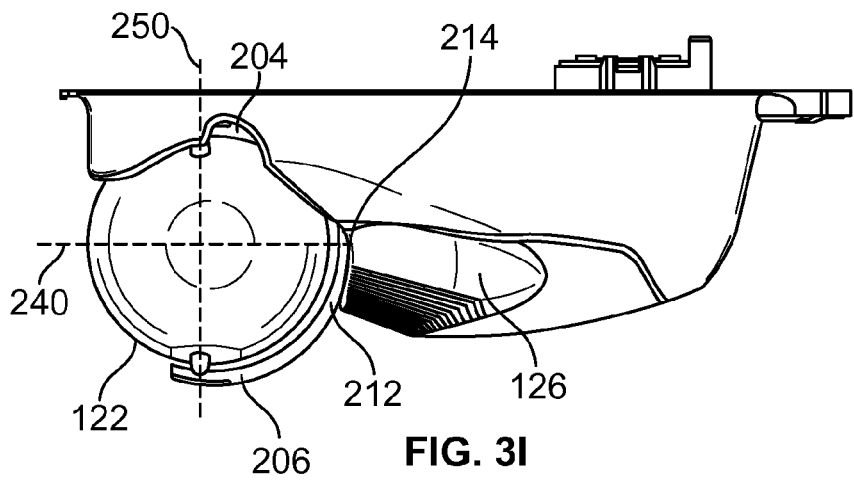
Figure 3J:
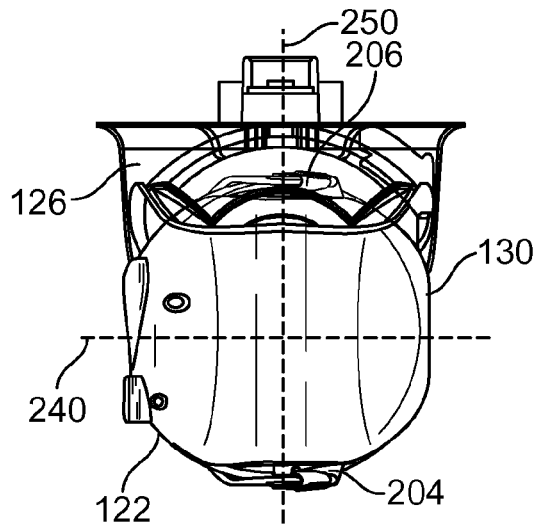

FIG. 3I is a side view and FIG. 3J is a front view of the ball turret 122 at zero degrees tilt and negative ninety degrees roll. In FIGS. 3I and 3J, the ball turret 122 has been actuated around the roll axis 240 from the positions shown in FIGS. 3A and 3B by rotating the drive shaft 214 and thereby the yoke 202. The rotation around the tilt axis 250 remains the same and therefore the cameras 130 and 132 are pointing to the right side of the aircraft 100.

Figure 3K:
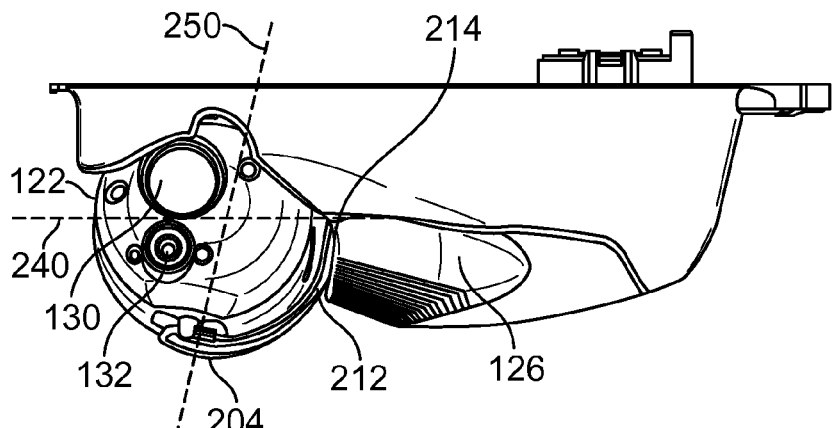
Figure 3L:
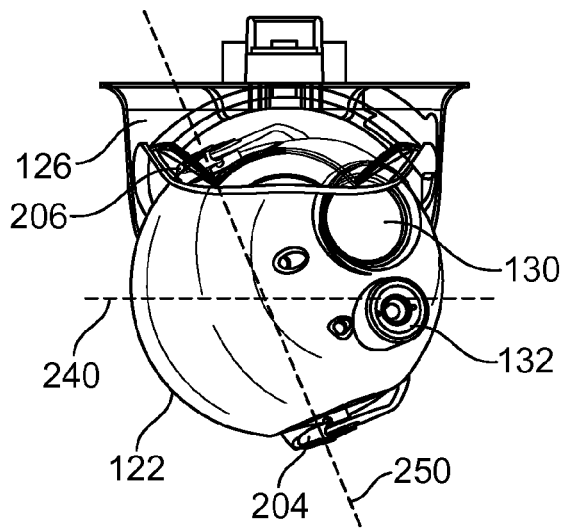

FIG. 3K is a side view and FIG. 3L is a front view of the ball turret 122 at positive twenty degrees tilt and positive one hundred ten degrees roll. In FIGS. 3K and 3L, the ball turret 122 has been actuated around the roll axis 240 from the positions shown in FIGS. 3A and 3B via rotating the drive shaft 214. The rotation around the tilt axis 250 is at about twenty degrees by rotating the ball turret 122 relative to the yoke 202. The cameras 130 and 132 are therefore pointing to the left front side of the aircraft 100 at an angle above the plane of the flight path of the aircraft 100.

Figure 4A:
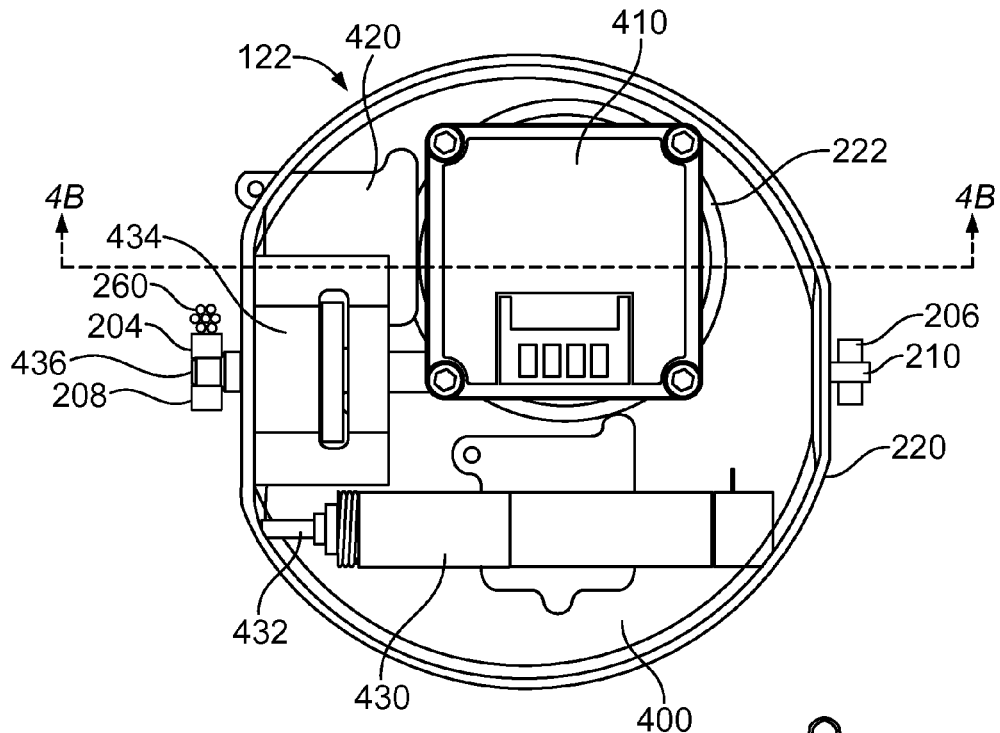
FIG. 4A is a cross-section view of the example ball turret of FIG. 2A and related components.
Figure 4B:
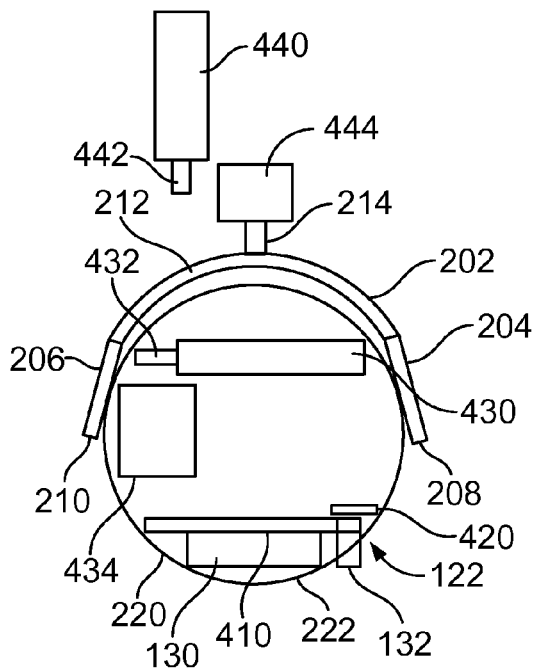
FIG. 4B is a cross-section top view of the example ball turret of FIG. 2A taken along the line 4B-4B' in FIG. 4A.

FIGS. 4A and 4B are cross-section views of the example ball turret 122 and the related ball turret assembly 118 of FIG. 2. As shown in FIGS. 4A-4B, an interior surface 400 of the ball turret 122 encloses various mechanical and electrical components. The infrared camera 130 is mounted on a circuit board 410 while the color camera 132 is mounted on a circuit board 420. The circuit boards 410 and 420 are fixed on the interior surface 400 in order to orient the infrared camera 130 through the aperture 222 and the color camera 132 through the mounting cylinder 224. The tilt actuator includes a tilt motor 430 that rotates a drive shaft 432. The drive shaft 432 drives the gears in a gear box 434. The gear box 434 down shifts the rotations from the motor 430 to rotate a drive shaft 436 that is mounted on the pin 208 rotatably coupled to the prong 204 of the yoke 202. The other prong 206 of the yoke 202 is rotatably mounted on the pin 210 on the exterior of the ball turret 122.

Figure 4C:
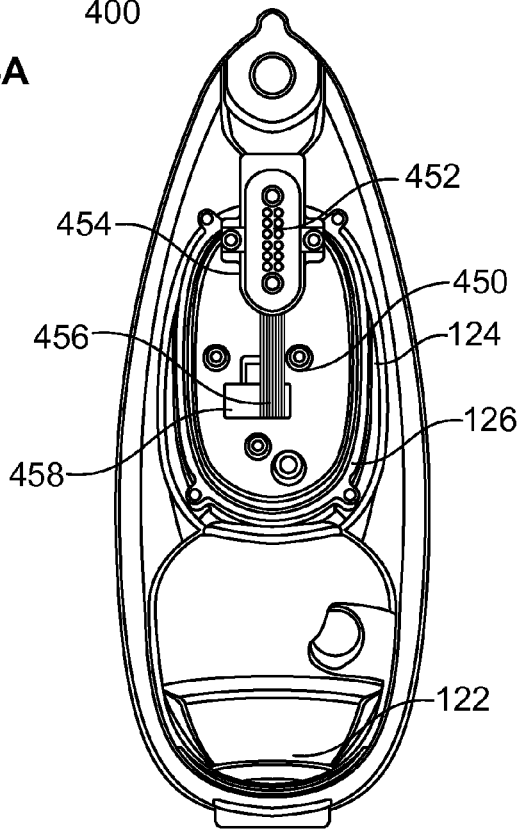
FIG. 4C is a cross-section top view of the example ball turret assembly of FIG. 2A.

The yoke 202 is mounted on the drive shaft 214 which is connected to the fairing 126. The fairing 126 encloses the actuators for the roll or pan motion. The roll actuator thus drives the drive shaft 214 and the yoke 202. The fairing 126 encloses a pan or roll motor 440 which rotates a drive shaft 442 which drives a gear box 444. The gear box 444 in turn drives the drive shaft 214 to rotate the yoke 202. FIG. 4C is a top view of the housing 124 which includes the fairing 126 and the ball turret 122. The fairing 126 encloses a circuit board 450 that holds the electronics for controlling the tilt and roll actuators. A vertical tab 452 includes an electronic connector 454 which provides connections to electronic components contained in the fuselage 102. A set of cables 456 extend from the connector 454 through an aperture 458 to provide control and data signals to and from the electronic components in the fairing 126 and the ball turret 122.

As shown in FIG. 2B, the wiring harness 260 containing wiring for power, data and communications extends from the fairing 126 to the ball turret 122 through a slip ring assembly and the interior of the drive shaft 214. As shown in FIGS. 2B and 2C, the wiring harness 260 is attached to the yoke 202 and follows the prong 204 to the interior of the ball turret 122. The controls for the roll and tilt actuators prevent the ball turret 122 from rotating the yoke 202 to tangle the wiring harness 260. Since the data connections are hardwired from sensors such as the cameras 130 and 132, maximum bandwidth may be achieved from image data acquired by the cameras 130 and 132.

This arrangement allows the cameras 130 and 132 in the turret 122 maximum view of the area of interest and reduces the drag of the turret assembly 118. As explained above, the pan or roll mechanics (actuators) driving the yoke 202 are located behind the ball turret 122 in the fairing 126. Since the actuators for the roll motion are mounted in the fairing 126 and movement occurs only in the roll actuator in the fairing 126 to rotate the yoke 202 holding the ball turret 122, the yoke 202 has no moving parts or electronic components. This allows the ball turret 122 and fairing 126 alone to be water proofed to protect the electronic and mechanical components of the ball turret assembly 118 contained in the ball turret 122.

Figure 5:
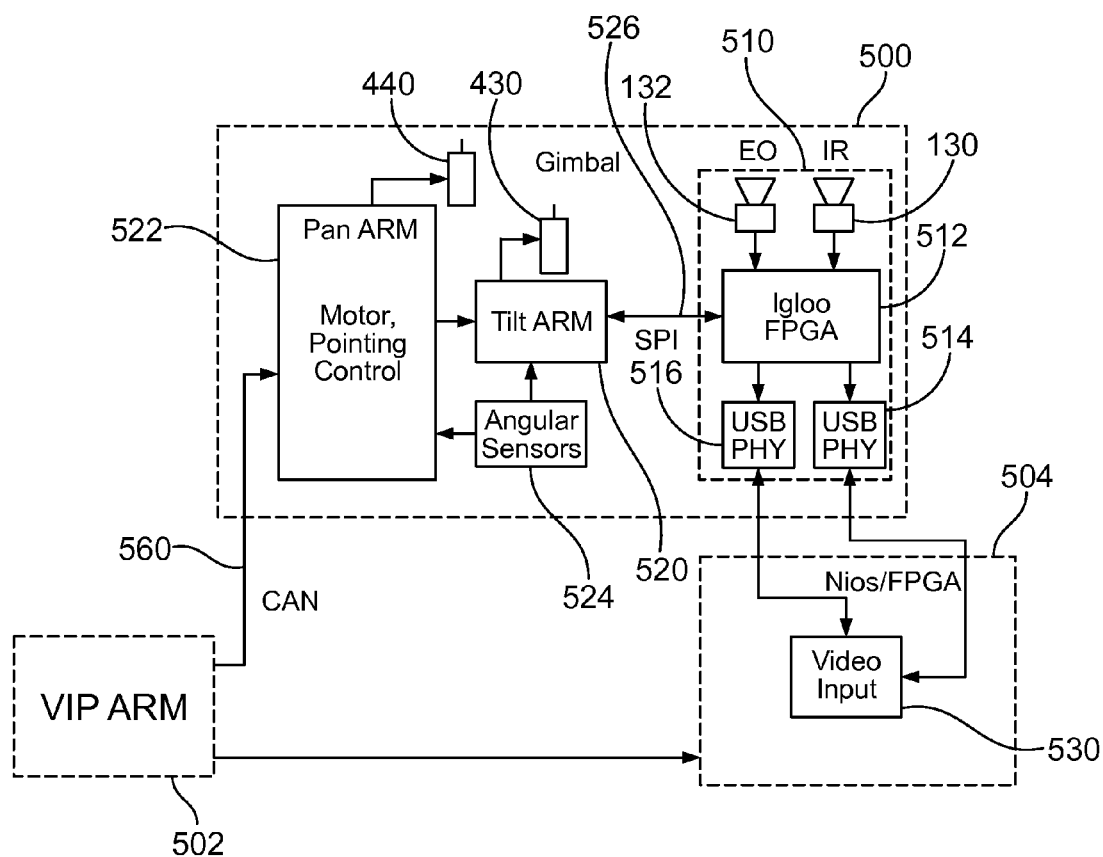
FIG. 5 is a block diagram of the electronic and mechanical control systems and data acquisition systems in the ball turret assembly in FIG. 2.

FIG. 5 is a block diagram of the electronic and mechanical control systems and data acquisition systems in the ball turret assembly 118 and fuselage 102 of the aircraft 100 in FIG. 1. Identical elements are labeled with identical reference numbers as in FIGS. 1-4. The control systems include a ball turret control system 500, an air vehicle control system 502 and a data processing system 504. As will be explained the control system 502 and data processing system 504 are stored entirely within the fuselage 102 of the aircraft 100 in this example.

The ball turret control system 500 includes mechanical actuators to roll and tilt the ball turret 122 relative to the aircraft 100 as well as an electronics module 510 to manage the data output from the cameras 130 and 132. The electronics module 510 is contained within the ball turret 122 and includes the cameras 130 and 132 that are coupled to a video controller 512. The cameras 130 and 132 output raw image data to a video controller 512. The video controller 512 in this example is a field programmable gate array (FPGA) configured to process the parallel raw image data from the cameras 130 and 132. The FPGA is configured to accept the parallel data from the cameras 130 and 132 and serialize it for the video output. The outputs of the video controller 512 are sent to two USB ports 514 and 516. Of course the data may be routed using other output interfaces. The USB ports 514 and 516 are coupled to the data processing system 504 in the fuselage 102 of the aircraft 100.

The ball turret control system 500 includes a tilt control module 520 that controls the tilt motor 430 and a pan or roll control module 522 that controls the roll motor 440. As explained above, the tilt control module 520 is contained in the turret 122 while the pan or roll control module 522 and roll motor 440 are contained in the fairing 126 in FIG. 2A. The tilt control module 520 and the roll control module 522 are coupled to a set of angular sensors 524 that sense the position of the turret 122. In this example, the angular sensors 524 are magnetic sensors that track magnets on the yoke 202 to sense the tilt angular position, and another magnet on the roll drive shaft to sense the roll angular position. A Serial Peripheral Interface (SPI) coupler 526 connects the video controller 512 with the tilt control module 520 to provide data on video display for purpose of orientating an image such as for compensating for rotation and zoom.

The video data processing system 504 receives serial video data from the USB ports 514 and 516 via a video input controller 530. The serial video data includes information on how to display each image frame such as rotation and scale. The video data processing system 504 may include an FPGA to convert the raw video data to a data feed to a ground station. The video data processing system 504 may perform stab/tracker according to settings stored by the controller 530. The video input controller 530 thus receives the input serial video data from the USB ports 514 and 516 and stabilizes the video frame by frame. The video input controller 530 also offsets the video display and smoothes the images from frame to frame to filter out rapid movement. The video data processing system 504 may also perform automatic gain control measurements on the video data and return the results to the ground station.

The ball turret control system 500 also includes the air vehicle control system 502 which sends control signals via a controller area network (CAN) connector 560 to the tilt control module 520 and the roll control module 522 to position the ball turret 122 relative to the aircraft 100. The air vehicle control system 502 receives commands from a remote ground controller (not shown). The ground controller may send commands to position the ball turret 122 via a control device such as a joystick. The air vehicle control system 502 forwards the received commands to the tilt control module 520 and the roll control module 522 to rotate the ball turret 122 to the desired position via the tilt and roll motors 430 and 440. The air vehicle control system 502 also provides sensor and state estimates based on position and speed sensors on the aircraft 100. The position of the aircraft is passed from the air vehicle control system 502 to the control system 500 via the CAN connector 560 as input data for an algorithm to stabilize and orient the turret 122 to maintain lock on a ground target and therefore compensate for movement of the aircraft 100. The algorithm runs on a processor 700 in the roll control module 522 as will be explained below. The algorithm converts the aircraft state data such as the aircraft state estimate and body rates into a state estimate internally and then passes commands based on the data to the motor controller software running on cortex processors 600 and 700 (shown in FIGS. 6 and 7) of the respective tilt control module 520 and the roll control module 522 to adjust the tilt and roll of the ball turret 122. The air vehicle control system 502 also provides mission data such as way points, the flight mode, joystick commands, and camera control data to the turret control system 500 via the CAN connector 560. The air vehicle control system 502 also interfaces with the video data processing system 504 by sending camera select commands and camera control data for an integrated image.

Figure 6:
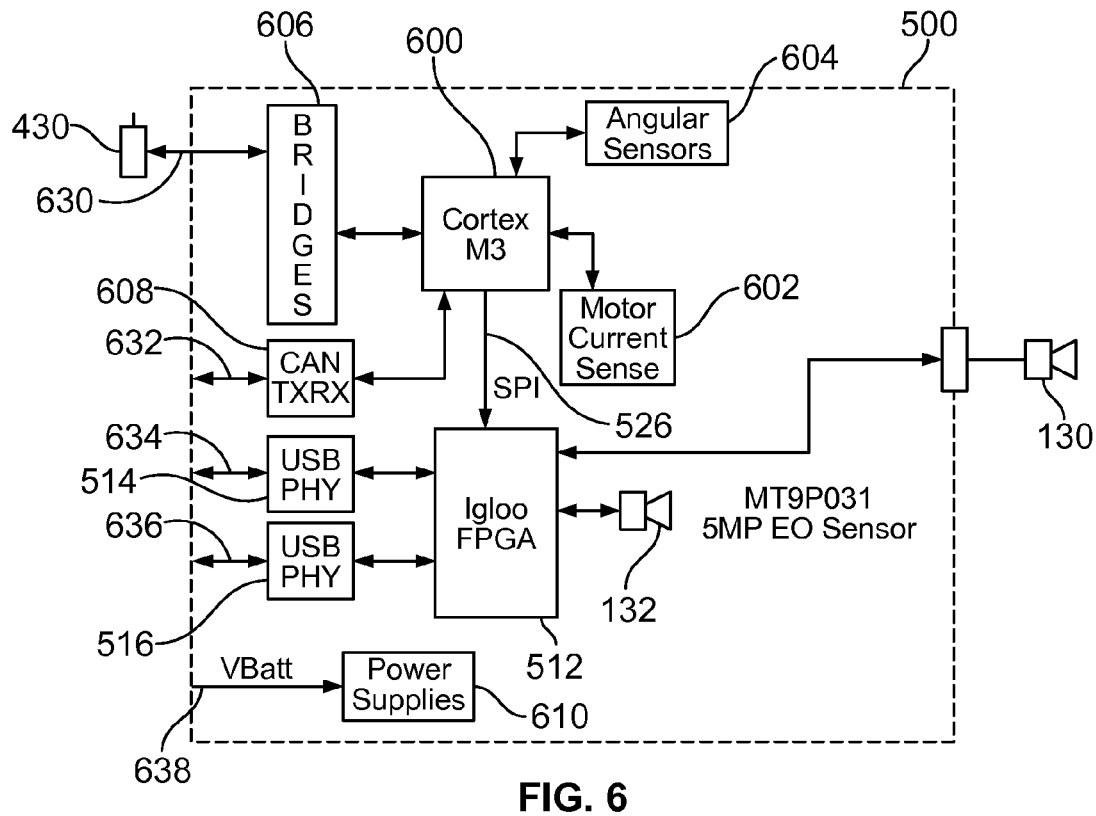
FIG. 6 is a block diagram of the tilt control system and the data acquisition control system in the ball turret in FIG. 2.

FIG. 6 is a block diagram of the ball turret control system 500 which includes various circuit boards and electronic components contained in the ball turret 122 in FIG. 2. As explained above, the tilt control module 520 contains inputs and outputs to the infrared camera 130 and the color camera 132. The tilt control module 520 is also coupled to the tilt motor 430.

The control system 500 includes a cortex processor 600, a tilt motor current sensor 602, a tilt angular sensor 604, a bridge 606, a CAN receiver/transmitter 608 and a power regulator 610. The cortex processor 600 controls the motor 430 via the bridge 606 in response to commands received on the CAN receiver/transmitter 608. The cortex processor 600 obtains motor rotation data from the motor sensor 602 and the angular sensor 604 and sends the data to the CAN receiver/transmitter 608. The angular sensor 604 is an angular or proximate Hall effect sensor in this example that senses the magnetic field of a magnet on yoke 202 to determine the angular position of the ball turret 122. A series of connectors including a motor control connector 630, a CAN connector 632, a pair of USB connectors 634 and 636 and a power connector 638 are bundled in the wiring harness 260 to connect the control system 500 to the components in the fairing 126.

The power regulator 610 receives power from the power connector 638 which is coupled to a power supply such as batteries carried by the aircraft 100. The power regulator 610 provides power to the electrical components at different voltages specific to the electronic component.

Figure 7:
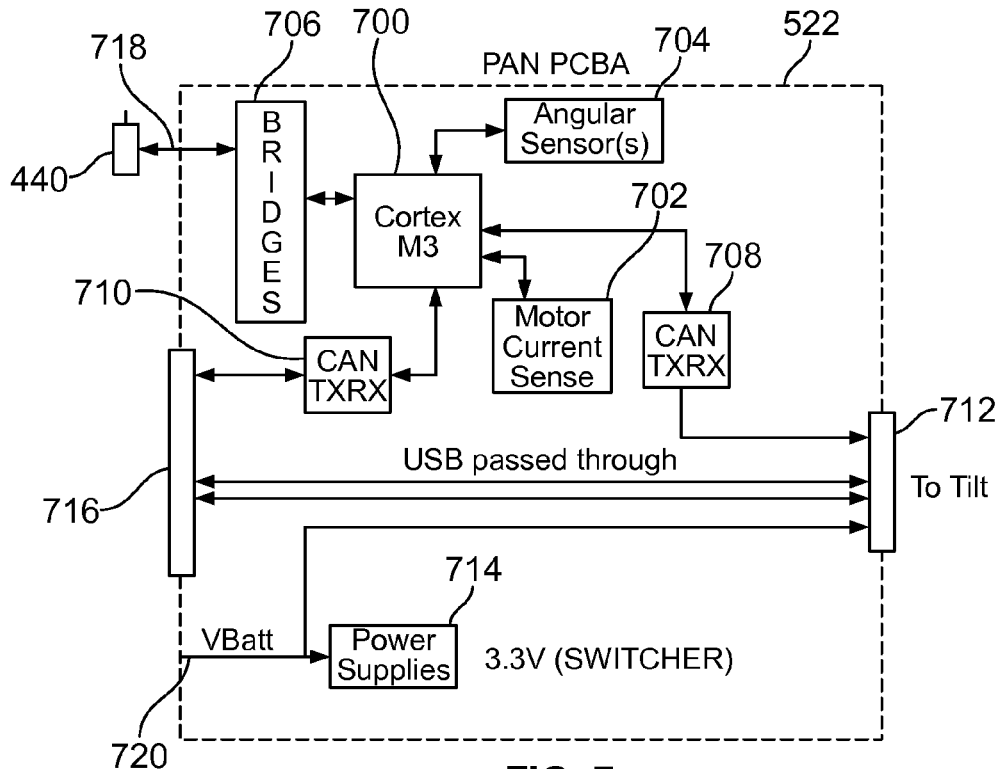
FIG. 7 is a block diagram of the pan or roll control system in the ball turret mounting in FIG. 2.

FIG. 7 is a block diagram of the roll control system 522 in the ball turret assembly 118 in FIG. 2. The roll control system 522 includes a cortex processor 700, a roll motor current sensor 702, a roll angular sensor 704, a bridge 706, a CAN receiver/transmitter 708, a second CAN receiver transmitter 710, a tilt system interface 712, a power regulator 714, and a control system interface 716. The cortex processor 700 controls the roll or pan motor 440 with motor control input 718 to the bridge 706 in response to commands received on the CAN receiver/transmitter 710. The cortex processor 700 relays tilt commands via the CAN receiver/transmitter 708 via the tilt interface 712 to the tilt control module 520. The cortex processor 700 obtains motor rotation data from the motor sensor 702 and the angular sensor 704 and sends the data to the CAN receiver/transmitter 708 which sends the data to the air vehicle control system 502 in FIG. 5. The angular sensor 704 is an angular or proximate Hall effect sensor in this example that senses the magnetic field of a magnet mounted on the yoke 202 to determine the roll angular position of the ball turret 122.

The power regulator 714 receives power from a power input 720 which is coupled to a power supply such as batteries carried by the aircraft 100. The power regulator 714 provides power to the electrical components at different voltages specific to the electronic component.

With the present configuration of the ball turret 122, solid wire connections may be used such as the wiring harness 260 between the roll actuator controls and the electronic controls in the ball turret 122 since the turret 122 is mounted in front of the fairing 126 thereby eliminating a slip ring or brush configuration. Because of this mounting and the natural constraints of the body of the aircraft 100, the pan and tilt movements do not twist the wiring harness when the cameras 130 and 132 are pointed down to the ground and moved to the left or right. Such a configuration also avoids gimbal lock when positioning the cameras 130 and 132 straight below the aircraft for applications such as mapping. The fairing 126 in conjunction with the housing 124 surround the ball turret 122 and function as smooth surfaces with reduced cross section to reduce drag.

Figure 8:
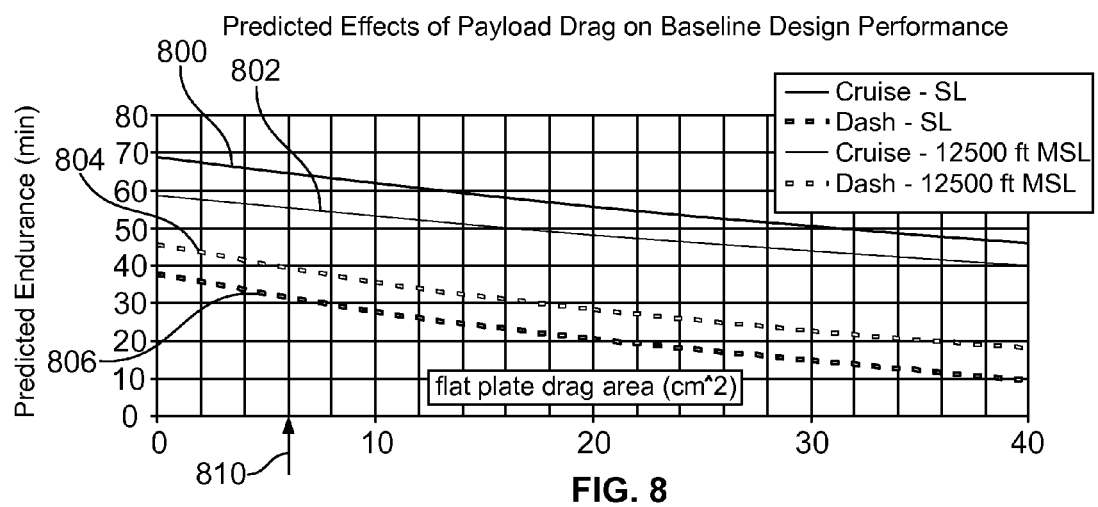
FIG. 8 is a diagram showing the drag parameters of the design of the ball turret in FIG. 1.

FIG. 8 is a series of drag profiles at different speeds of the aircraft 100 with various cross-sections measured in drag area. The horizontal axis represents the drag area of the ball turret assembly 118 while the vertical axis represents the endurance of the aircraft 100. A solid line 800 represents drag at sea level at cruise speed. A solid line 802 represents drag at an altitude of 12,500 feet at cruise speed. A dashed line 804 represents drag at maximum air speed at sea level. A dashed line 806 represents drag at maximum air speed at 12,500 feet altitude.

As shown in FIG. 8, the endurance of the aircraft is affected by the cross section area of the ball turret assembly 118 which creates drag. The larger the cross section area of the ball turret assembly 118, the shorter the endurance of the aircraft. An arrow 810 represents the cross section area of the mounting of the ball turret assembly 118 in FIGS. 2-4. As may be shown, the ball turret 122 in conjunction with the fairing 126 reduces the forward profile of the ball turret 122 and decreases drag. As explained above, the pan or roll mechanics (actuators) are contained in the fairing 126 and behind the ball turret 122 thereby reducing the drag from such components.

Figure 9:
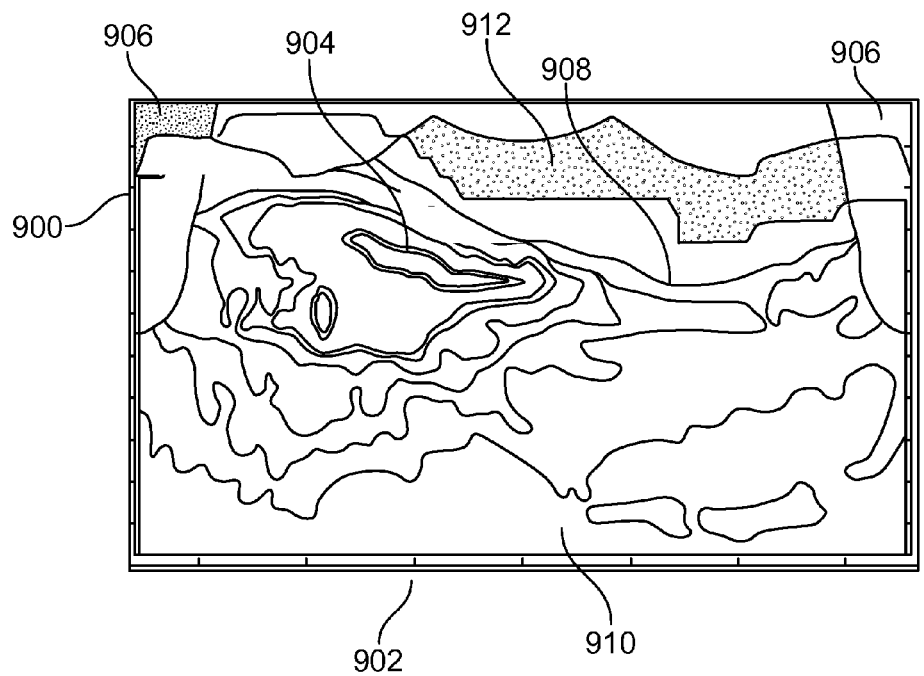
FIG. 9 is a coded diagram of the most frequent used viewing areas for roll and tilt actuation of the ball turret in FIG. 1.

FIG. 9 is a graphic showing the desired areas of the positioning of the ball turret 122 relative to the cameras 130 and 132. A vertical axis 900 represents the elevation which is controlled by a combination of the roll and tilt of the ball turret 122. The elevation is limited by the fuselage 102 of the aircraft 100 and therefore ranges from negative 90 degrees (straight down) to positive 20 degrees. A horizontal axis 902 represents the azimuth which ranges from negative 180 degrees to positive 180 degrees. A set of areas 904 represents the general position of the cameras 130 and 132 for functions such as surveillance and reconnaissance. A set of other areas 906 represents areas that are blocked by the aircraft 100. A set of areas 908 represent other areas that may be potential positions for the cameras 130 and 132 during a variety of missions. A set of areas 910 represents the general position of the cameras 130 and 132 for functions such as mapping. In previous systems, this is the set of areas most affected by limited performance due to gimbal lock. A final set of areas 912 represents a region of lower or minimal observation interest (namely, an area above the horizon and generally ahead of the air vehicle). Within the areas 912 can lie an area or region (such as area 1006, described below in FIG. 10), where the performance of the turret 122 is limited and/or effected by the turret's gimbal lock. As such, this area 912 is not of typical use or importance to any anticipated gimbal operations and functions. That is, by aligning the roll-axis to be directed above the horizon and in front of the aircraft 100 during its typical operations, the region or area of gimbal lock is placed such that it will have minimum to no effect on the typical operation of the ball-turret 122.

Figure 10:
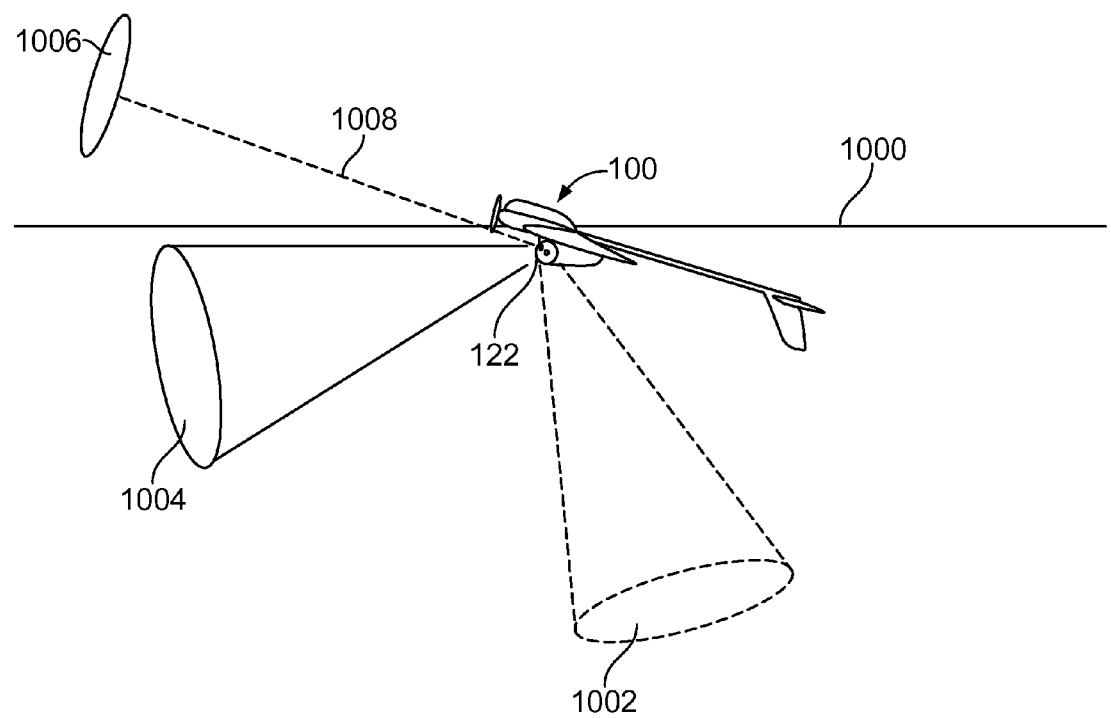
FIG. 10 is a view of the example aircraft in FIGS. 1A-1B in flight with the areas of gimbal lock of the ball turret.

FIG. 10 is a view of the example aircraft 100 in FIGS. 1A-1B in flight with the areas of gimbal lock of the ball turret 122 such as those shown in the areas 912 of the graphic in FIG. 9. The aircraft 100 is shown in flight relative to a line 1000 representing the horizon. As shown in FIG. 10, the aircraft 100 is generally flown at an angle relative to the horizon 1000 (that is, the aircraft while flying may have a positive angle of attack relative to a horizontal, or substantially horizontal, direction of travel). The turret 122 is generally pointed at areas on the ground such as an area 1002 which avoid gimbal lock. The turret 122 may be pointed to an area 1004 that is straight ahead of the flight of the aircraft 1000 and avoid gimbal lock due to the angle of the aircraft 100 relative to the horizon 1000. As may be seen in FIG. 10, when pointed at the area 1004, the ball turret 122 is actually tilted relative to the center axis of aircraft 100. The ball turret 122 is in gimbal lock in a position 1006 above the horizon 1000 that is aligned with a dashed line 1008 representing the tilt axis of the turret 122. The area 1006 is above the horizon 1000 and therefore is not generally used (as the vehicle is typically used to view and track ground based objects) thereby avoiding gimbal lock. This positioning of the roll-axis also provides the benefit of allowing a roll-axis control motor or actuator to be positioned in the fairing positioned directly behind the ball-turret 122 (such as the fairing 126 shown in FIGS. 1-4 and referenced herein above).

The various controllers such as the video controller 512 in FIG. 5, and the cortex processors 600 and 700 in FIGS. 6 and 7 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A turret assembly for attachment on the undersurface of an aircraft, the assembly comprising:
   a roll actuator including a drive shaft;
   a yoke having a cross member coupled to the drive shaft and a pair of prongs, the yoke being rotated via the roll actuator and drive shaft along a roll axis oriented substantially parallel to the body of the aircraft;
   a turret mounted on the prongs of the yoke;
   a tilt actuator within the turret, the tilt actuator tilting the turret on a tilt axis relative to the yoke, the tilt axis being perpendicular to the roll axis;
   a fairing containing the roll actuator, the fairing coupled to the undersurface of the aircraft behind the turret; and
   a wiring harness for delivery of electrical signals between the turret and the fairing, the wiring harness including one or more wires having a first portion that extends through the drive shaft and a second portion that is mounted exteriorly of a first prong of the yoke, between the first prong and the turret.

2. The turret assembly of claim 1, wherein the turret has a generally spherical shape.

3. The turret assembly of claim 1, wherein the turret has an aperture and includes a sensor positioned in the aperture.

4. The turret assembly of claim 3, wherein the sensor includes at least one of a color camera and an infrared camera.

5. The turret assembly of claim 4, further comprising a video controller located within the turret, the video controller coupled to the sensor and providing a video output from the sensor.

6. The turret assembly of claim 1, wherein the tilt actuator includes a processor and a tilt motor and the roll actuator includes a processor and a roll motor, the processors accepting positioning inputs and controlling the respective tilt and roll motors to position the ball turret.

7. An aircraft comprising:
   a fuselage having an undersurface;
   a control system accepting positioning commands from a ground station;
   a data control system for sending data to the ground station;
   a roll actuator including a drive shaft;
   a yoke having a cross member coupled to the drive shaft and a pair of prongs, the yoke being rotated via the roll actuator and drive shaft along a roll axis oriented substantially parallel to the body of the aircraft;
   a turret mounted on the prongs of the yoke;

a tilt actuator within the turret, the tilt actuator tilting the turret on a tilt axis relative to the yoke, the tilt axis being perpendicular to the roll axis;

a fairing containing the roll actuator, the fairing coupled to the undersurface of the aircraft behind the turret; and a wiring harness for delivery of electrical signals between the turret and the fairing, the wiring harness including one or more wires having a first portion that extends through the drive shaft and a second portion that is mounted exteriorly of a first prong of the yoke, between the first prong and the turret.

8. The aircraft of claim 7, wherein the turret has a generally spherical shape.

9. The aircraft of claim 7, wherein the turret has an aperture and includes a sensor positioned in the aperture.

10. The aircraft of claim 9, wherein the sensor includes at least one of a color camera and an infrared camera.

11. The aircraft of claim 9, further comprising a video controller located within the turret, the video controller coupled to the sensor and providing a video output from the sensor.

12. The aircraft of claim 7, wherein the tilt actuator includes a processor and a tilt motor and the roll actuator includes a cortex controller and a roll motor, the processor accepting positioning inputs and controlling the respective tilt and roll motors to position the ball turret.

* * * * *